May 5, 1936.  L. J. VETRANO  2,039,465

VALVE MECHANISM

Filed March 6, 1933  3 Sheets-Sheet 1

Inventor
Leon J. Vetrano

By Hardway Mathey
Attorneys

May 5, 1936.  L. J. VETRANO  2,039,465

VALVE MECHANISM

Filed March 6, 1933  3 Sheets-Sheet 3

Inventor
Leon J. Vetrano

Hardway Cather
Attorneys

Patented May 5, 1936

2,039,465

UNITED STATES PATENT OFFICE 2,039,465

VALVE MECHANISM

Leon J. Vetrano, Houston, Tex.

Application March 6, 1933, Serial No. 659,711

6 Claims. (Cl. 251—68)

This invention relates to valve mechanism.

An object of the invention is to provide a valve mechanism of the character described especially adapted to be connected into a flow line and comprising a valve casing and a controlling assembly therein having a flow way therethrough and movable into one position to close the flow way and into another position to open the flow way and when in said last mentioned position forming a continuous conduit through the valve casing.

Another object of the invention is to provide, in a mechanism of the character described, a controlling assembly, which is adapted to form a close fit within the valve casing so as to form a fluid tight joint between the controlling assembly and the casing when the controlling assembly is in either of said positions.

A further object is to provide, in a valve mechanism, a controlling assembly comprising an expansible sleeve and a core within the sleeve, said core and sleeve having coacting parts by means of which the sleeve may be expanded to form a close fit within the casing when the controlling assembly is in either of said positions.

A still further object is to provide, in a valve mechanism a controlling assembly having a tapering flow way therethrough for the purposes hereinafter more specifically explained.

A still further object of the invention is to provide novel means for actuating the controlling mechanism into conduit closing or conduit opening positions.

Figure 1:
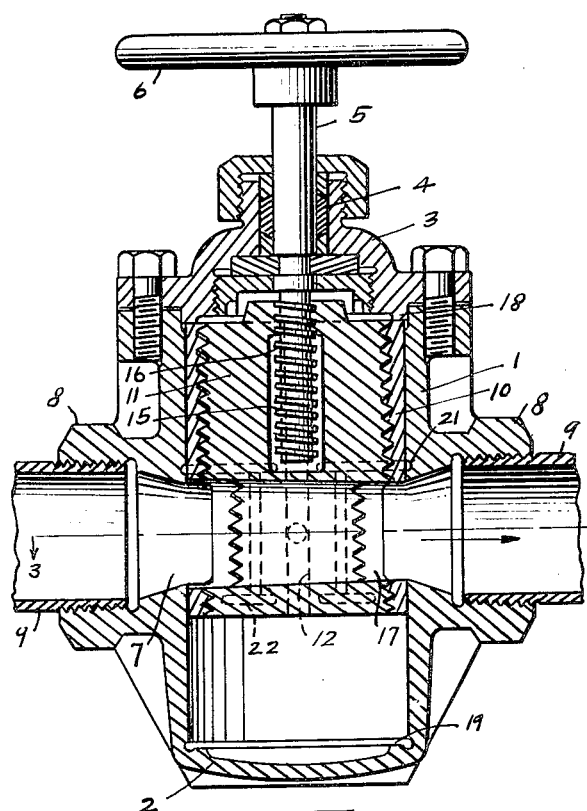

With the above and other objects in view the invention has particular relation to certain novel features of construction, operation and arrangement of parts, an example of which is given in this specification and illustrated in the accompanying drawings, wherein:

Figure 1 shows a longitudinal sectional view of one form of the valve mechanism.

Figure 2:
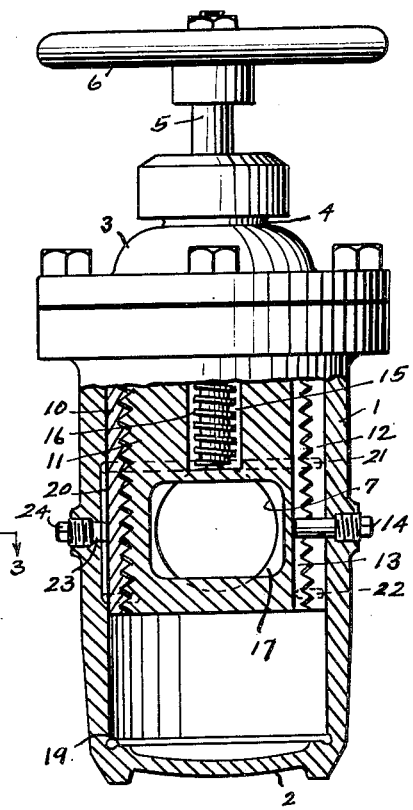
Figure 3:
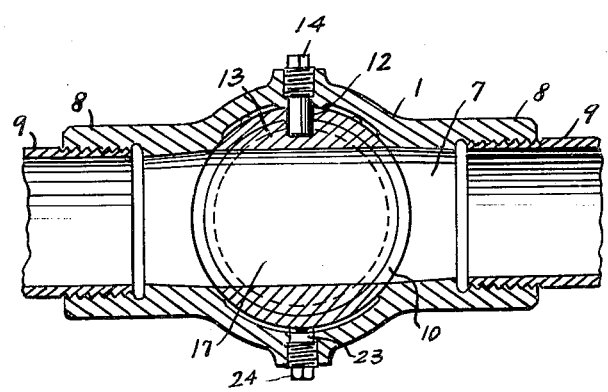
Figure 4:
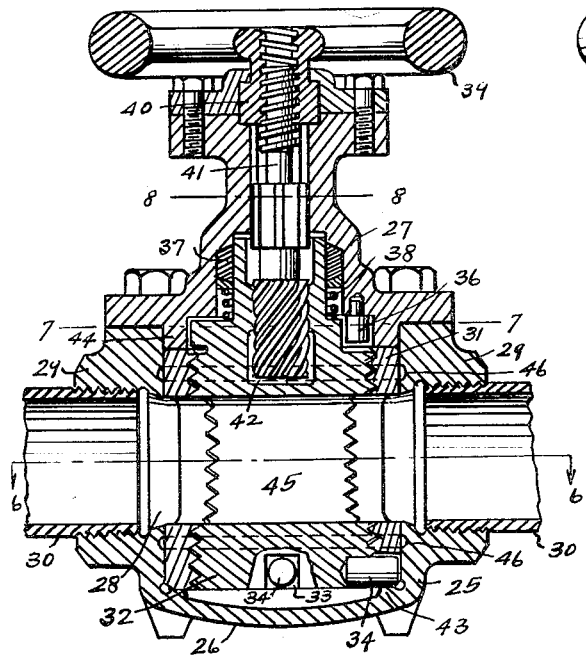
Figure 5:
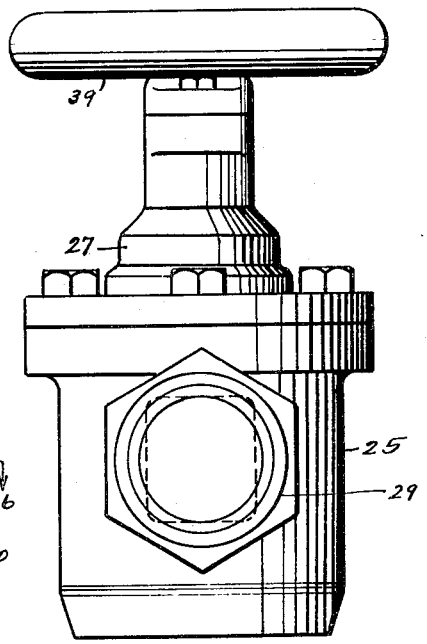
Figure 6:
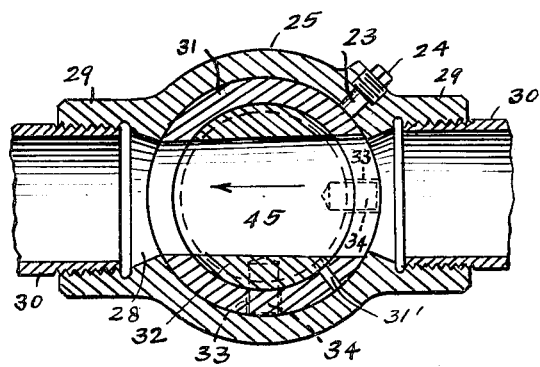
Figure 7:
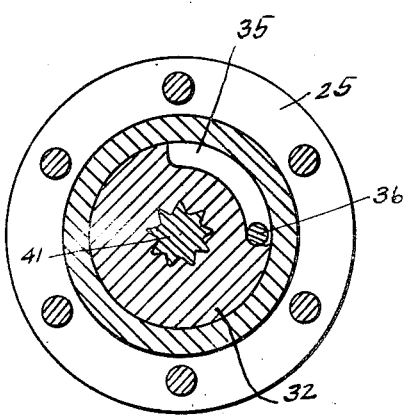
Figure 8:
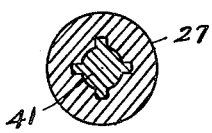
Figure 9:
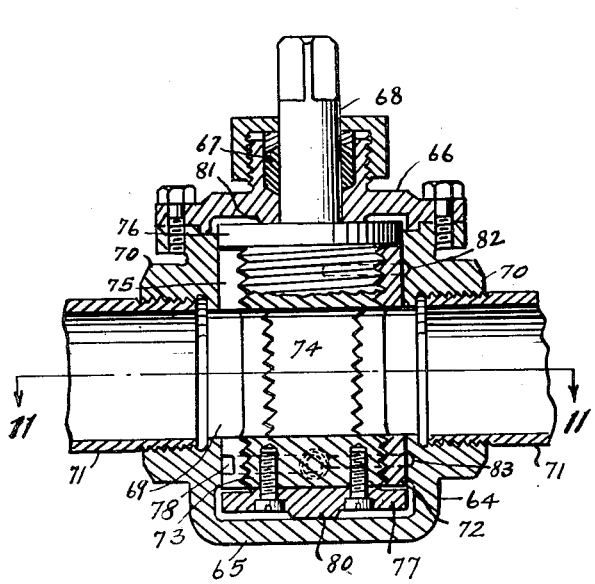
Figure 10:
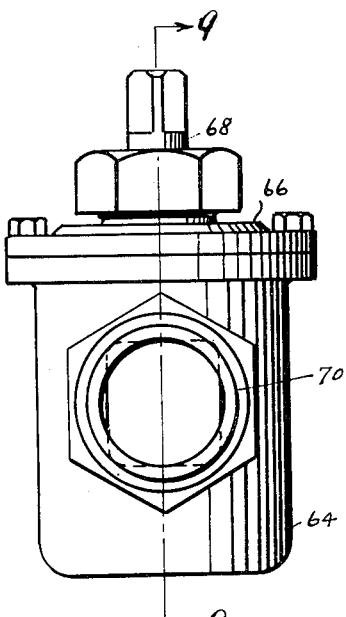
Figure 11:
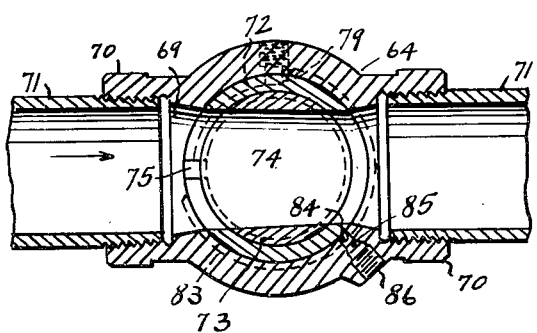

Figure 2 shows a side view partly in section taken at right angles to the view shown in Figure 1; Figure 3 shows a cross sectional view taken on the line 3—3 of Figure 1; Figure 4 shows a longitudinal sectional view of a modified form of the valve mechanism; Figure 5 shows a side elevation; Figure 6 shows a transverse sectional view taken on the line 6—6 of Figure 4; Figure 7 shows a transverse sectional view taken on the line 7—7 of Figure 4; Figure 8 shows a cross sectional view taken on the line 8—8 of Figure 4; Figure 9 shows a longitudinal sectional view of still another form of the valve taken on the line 9—9 of Figure 10; Figure 10 shows a side elevation thereof; and Figure 11 shows a horizontal sectional view taken on the line 11—11 of Figure 9.

In the drawings the numeral 1 designates a valve casing approximately cylindrical in form and closed at one end by the plate 2 which is preferably formed integrally with the valve casing. The other end of the valve casing is closed by a bonnet 3, which contains the stuffing box 4. A valve stem 5 works through said stuffing box and has a swivelling connection with the bonnet 3. This stem may be rotated in any suitable manner as by a hand wheel 6 which is fixed to the outer end thereof. The casing has a passageway 7 for fluid therethrough and is provided with connections 8, 8 for the connection of the adjacent sections 9, 9, of a pipe or flow line thereto.

Within the casing 1 there is a controlling assembly comprising a sleeve 10 and a cylindrical core 11 therein. The sleeve 10 is split from end to end, forming a longitudinal keyway 12, and is internally threaded and the core 11 is externally threaded and screwed into said sleeve and has a longitudinal keyway 13 from end to end thereof aligned with the keyway 12. There is a key 14 which is threaded through the casing 1 and whose inner end projects through said keyways and holds the component parts of the assembly against relative rotation. The core 11 has a deep bore 15 into which the inner end of the stem 5 extends. The outer end of this bore is reduced and coarsely threaded internally and the inner end of the stem 5 has the external corresponding threads 16 which intermesh with the threads of said bore.

The controlling assembly has a flow way 17 which slightly tapers from its inflow to its outflow end, said flow way tapering in the direction indicated by the arrow in Figure 1.

It is obvious that by rotating the stem 5 in one direction the controlling assembly may be shifted into one position to align the flow way 17 with the passageway 7 and a continuous smooth conduit will thus be provided through the valve mechanism. When in this position one end of the sleeve 10 will abut the annular stop 18 of the bonnet 3 and the movement of said sleeve 10 will thereby be stopped. A further rotation of the stem 5 will cause a further endwise movement of the core 11 relative to the movement of the sleeve 10 and this further movement will cause the contacting sloping faces of the threads connecting the sleeve 10 and core 11, to coact to cause the expansion of the sleeve 10 causing said sleeve to fit tightly against the inside wall of the casing 1 around the passageway 7 on each side, thus forming tight joints around the conduit through the valve mechanism. If it be desired to close the flowways through the valve mechanism, the stem 5 may be rotated in the other direction thus moving the controlling assembly to the opposite end of the valve casing. Thereupon the sleeve 10 will contact against the annular stop 19, on the inner side of the end plate 2 and said sleeve will be thereby stopped in position to close the passageway 7 and a further rotation of the stem 5 will cause a slight additional lengthwise movement of the core 11 causing the threads connecting said sleeve and core to coact and expand the sleeve tightly against the inside walls of the casing to prevent leakage.

The inside walls of the casing 1 are provided with suitable lubricant channels 20, 21, 22 which surround the controlling assembly and which are suitably connected and a lubricant may be introduced into these channels through the opening 23 which is normally closed by the plug 24.

In the form shown in Figures 4 to 8 inclusive, the numeral 25 designates the casing which is approximately cylindrical in form and which is closed at one end by the end plate 26 preferably formed integrally with the casing. The other end of the valve casing is closed by a bonnet 27. The casing 25 has a passageway 28 for the flow of fluid therethrough and is provided with the connections 29, 29 for the connection of the adjacent sections 30, 30 of a pipe or flow line therethrough.

Within the casing 25 there is a controlling assembly comprising the sleeve 31 which is split from end to end, forming the slit 31' and internally threaded, and the core 32 which is threaded through said sleeve. The end of the sleeve 31 adjacent the end plate 26 has the notches, or keyways 33, 33 and the core 32 carries the keys or pins 34, 34 which project into said notches loosely and which key the component parts of the controlling assembly together.

The opposite end of the core fits snugly within the bonnet 27 and is provided with an arcuate keyway 35 which extends approximately 90 degrees around said core and there is a stop 36 carried by the bonnet and projecting into said keyway and which limits the rotation of the controlling assembly to approximately a one fourth rotation.

The bonnet end of the core is reduced and around said reduced portion within the bonnet there is a packing 37 which is normally maintained under compression by the coil spring 38.

At the outer end of the bonnet there is a hand wheel 39 whose hub 40 has a swivelling connection with the bonnet and is internally threaded. In the bonnet is a valve stem 41 with its outer end correspondingly threaded through said hub and said stem extends axially through said bonnet and is splined therein to permit the endwise movement only of said stem. The inner end of the stem is enlarged and is provided with coarse multiple threads which intermesh with the corresponding threads in the socket 42 of the core 32.

The split sleeve 31 is confined against endwise movement by the annular stop 43 at one end of the valve casing and by a similar annular stop 44 extending inwardly from the bonnet 27.

Upon a rotation of the hand wheel 39 in one direction a lengthwise thrust will be imparted to the stem 41 and the pitch of the multiple threads at the inner end of the stem 41 is such that the controlling assembly will be caused to rotate until stopped by the stop 36. Said controlling assembly has a passageway 45 therethrough shown in Figure 4 to be aligned with the passageway 28. Upon such actuation of the hand wheel 39 said controlling assembly will have rotated approximately ninety degrees so as to carry said passageway 45 around out of alignment with the passageway 28 and said last mentioned passageway will be thereby obstructed. A further rotation of the hand wheel 39 will cause a slight endwise movement of the core 32 and the sloping contacting faces of the threads connecting the core 32 and sleeve 31 will cause a slight expansion of the sleeve thus forming fluid tight joints between the casing and sleeve around the passageway 28 on both sides. Upon reversal of the rotation of the hand wheel 39 the controlling assembly may be given a quarter turn in the opposite direction to carry the passageway 45 into alignment with the passageway 28 so that flow will be permitted and upon a further rotation of said hand wheel 39 in the same direction there will be a slight endwise movement of the core 32 in the other direction the sloping contacting faces of the threads connecting the core and sleeve causing the expansion of said sleeve as before to form fluid tight joints around passageway 28 on each side. The inside wall of the casing is provided with suitable lubricating ducts 46 therearound into which a lubricant may be introduced through the inlet opening 23 which may be closed by the plug 24.

Referring to Figures 9 to 11 inclusive the numeral 64 designates the valve casing one end of which is closed by the end plate 65 preferably formed integrally with the casing and the other end of which is closed by the bonnet 66. This bonnet contains a stuffing box 67 of conventional form through which the valve stem 68 works. The valve casing has the passage 69 for the advance of a fluid therethrough and the lateral connections 70, 70 for the connection of the adjacent sections 71, of the flow line, to said valve casing.

Within the casing there is fitted the controlling assembly composed of the expansible sleeve 72, which is internally threaded, and the core 73 which is threaded through said sleeve. This controlling assembly has the passage 74 for the advance of fluid arranged to be turned into and out of alignment with the passage 69. The sleeve 72 is preferably split from end to end as at 75 so that it will be readily expansible although this sleeve, and the corresponding sleeve of the other forms may be made continuous, rather than split, if desired as a very small amount of expansion is required and if made of suitable material for the purpose, continuous sleeves would have the necessary expansible qualities.

The stem 68 is preferably formed integrally with the core 73 and has an annular fixed abutment 76 thereon which faces the corresponding end of the sleeve 72. A disc 77 is bolted or otherwise secured to the opposite end of the core 73 whose margin extends out flush with the outer surface of the sleeve 72. It will be noted that the sleeve 72 has a small amount of endwise movement relative to the core 73, between the abutment 76 and the end plate 77.

The controlling assembly above described has the external arcuate groove 78, extending approximately 90 degrees therearound from the split 75, and there is a pin 79, threaded through the casing wall which projects into said groove and limits the controlling assembly to a partial rotation.

Assuming that the passageways 69, 74 are in alignment, if it be now desired to close the passageway 69, the stem 68 may be turned, by a wrench or other appliance to the right until stopped by the pin 79 and the controlling assembly will thereby be in position to close the passageway 69 and a slight additional turning movement of the stem 68 will cause the sloping contacting faces of the threads of the controlling assembly to coact to expand the sleeve 72 to form close fitting joints between the sleeve and the inside wall of the casing around the passage 69 on each side. If the stem 68 be now turned in the other direction a quarter of a turn the passageway 74 will be carried into alignment with the passageway 69, forming a smooth continuous conduit through the valve casing and a slight further turning movement of the stem 68 will again cause the sloping contacting faces of the threads of the controlling assembly to coact, in the manner illustrated in Figure 9 to expand said sleeve 72 to form close fitting joints around the passage 69 on both sides. The core 73 is confined against endwise movement in the casing by the central boss 80, of the end plate 77 which abuts the end plate 65, and the annular inwardly extending boss 81 which extends inwardly from the bonnet 66 and abuts said core at the other end.

The inner wall of the casing 64 has the lubricating channels 82, 83 which are connected by the connecting channel 84. A lubricant may be introduced into these channels through the inlet opening 85 which is normally closed by the plug 86.

In each form it is to be noted that the flow ways 17, 45, 57, and 74, taper slightly from the pressure side to the opposite side of the controlling assembly so that in closing the valve, the last mentioned end of said flow way through the controlling assembly will close earlier thereby stopping the flow to prevent erosion of the seat on the pressure side. This is particularly desirable when gritty fluids are being conducted.

The drawings and description disclose what are now considered to be preferred forms of the invention by way of illustration while the broad principle of the invention will be defined by the appended claims.

What I claim is:

1. A valve mechanism including a valve casing having a passage for the advance of fluid therethrough, a controlling assembly in the casing comprising an expansible sleeve and a core, and completely surrounded by the sleeve, said assembly having a passage for fluid therethrough, means for shifting said assembly into one position to align said passages and into another position to obstruct the casing passage, said sleeve and core having intermeshing threads effective to expand the sleeve at either of the final positions of said assembly.

2. A valve mechanism comprising a valve casing having a passage for fluid therethrough, a controlling assembly in the casing having a passage for fluid therethrough and composed of a core and an expansible sleeve completely surrounding the core, means for moving said assembly longitudinally in the casing into one position to close the passage through the casing to prevent the flow of fluid and into another position to align said passages to permit the flow of fluid, abutments to limit the movement of the sleeve in each direction, said moving means being effective to move the core longitudinally, independently of the sleeve beyond the limits of the sleeve movement, said sleeve and core having cooperating threads effective to expand the sleeve upon such independent longitudinal movement of the core relative to the sleeve.

3. A valve mechanism comprising a valve casing having a passage for fluid therethrough, a controlling assembly in the casing having a passage for fluid therethrough, said controlling assembly being composed of an inner body and an expansible sleeve surrounding said body and fitted into said casing, means for moving the assembly in one direction to close the passage through the casing and in another direction to align said passages, means for limiting the movement of the sleeve in each of said directions and arranged to permit the further movement of said inner body axially in each direction, and intermeshing threads for causing the expansion of the sleeve upon such further movement of the body in either direction.

4. A valve mechanism comprising a valve casing having a passage for the advance of fluid therethrough, a controlling assembly in the casing composed of an inner cylindrical support and a surrounding expansible sleeve on said support, said assembly having a passage for fluid therethrough and being shiftable in one direction to obstruct the flow of fluid through the casing and in another direction to align said passages to permit such flow, said support and sleeve having intermeshing threads arranged to coact upon axial movement of the body relative to the sleeve to expand the sleeve upon final movement of said assembly in either direction.

5. A valve mechanism comprising a valve casing having a passage for the advance of fluid therethrough, a controlling assembly in the casing composed of an inner cylindrical support and a surrounding expansible sleeve on said support, said assembly having a passage for fluid therethrough and being shiftable in one direction to obstruct the flow of fluid through the casing and in another direction to align said passages to permit such flow, said support and sleeve having intermeshing threads arranged to coact to expand the sleeve upon final axial movement of said support in either direction, and means connected to said support by which said assembly may be shifted.

6. A valve mechanism comprising a valve casing having a passage for the advance of fluid therethrough, a controlling assembly in the casing composed of an inner support and a surrounding expansible sleeve on said support, said assembly having a tapering passage for fluid therethrough and being shiftable into one position to obstruct the flow of fluid through the casing and into another position to align said passages to permit such flow, said support and sleeve having spiralled, contacting faces which coact to expand the sleeve when the controlling assembly is moved to either final position, and means connected to the support for shifting said assembly.

LEON J. VETRANO.